United States Patent Office 3,450,762
Patented June 17, 1969

3,450,762
PROCESS FOR PREPARING
PERFLUOROGUANIDINE
Donald L. Esmay, Coon Rapids, and Gerald W. Kottong, St. Paul, Minn., assignors to Minnesota Mining and Manufacturing Company, St. Paul, Minn., a corporation of Delaware
No Drawing. Filed Mar. 11, 1966, Ser. No. 535,642
Int. Cl. C07c 129/02
U.S. Cl. 260—564     3 Claims

ABSTRACT OF THE DISCLOSURE

Direct fluorination process which comprises direct fluorination of ammeline in the presence of from about 0.1 to 10 times its weight of water, and/or sodium fluoride, or additional inert liquid diluent, to produce improved yields of perfluoroguanidine. Temperatures of the order of −40° to +35° C. and pressures up to 10 atmospheres are employed.

---

This invention relates to a process for the direct fluorination of ammeline to provide perfluoroguanidine.

Objects of the invention include an improved process for the production of perfluoroguanidine.

The process of the invention provides increased conversion of the fluorine consumed and, also, notably increases the yield of perfluoroguanidine at the expense of and less contaminated with tris(difluoramino)fluoromethane otherwise obtained. The unusual feature of the invention is that fluorination is effected in an inert fluorinated solvent in the presence of water.

Broadly speaking, the process of the invention comprises the direct fluorination of ammeline in the presence of at least about 10 percent by weight of water based upon the total amount of reactant.

Sodium fluoride may be included in the reaction mixture in amount of from about 10 to 100% of the weight of ammeline used.

The process may be effected using an unreactive liquid diluent such as perfluorocyclic ethers available as FC-75 or perfluorotri-n-butylamine available as FC-43 and suspending ammeline and sodium fluoride therein. It is also found to be effective to dispense with the unreactive liquid diluent and sodium fluoride and suspend the ammeline in water in very large excess. In this procedure 5–10 times as much water as ammeline is used whereas from 0.1 to 3 times as much is used with the liquid diluent.

Reactors are of stainless steel and normal precautions for handling fluorine are observed as well as precautions dictated by the highly energetic impact-sensitive products. Reactors are selected of suitable size and fitted for operation within reaction conditions of about −40° C. to about +35° C. and pressures up to about 10 atmospheres and for agitation in the range of about 500 to 2500 r.p.m. Conveniently, they are flanged open pots with bottom outlet and liquid sampling means and a flanged cover with gasket boltable to the open lower pot and then capable of retaining pressures up to about 1000 p.s.i.g. Gaskets are of polytetrafluoroethylene. Where lubrication is needed, polytrifluorochloroethylene or other inert greases are used. The cover is fitted with mechanical agitator, pressure gauge and one or more thermocouple wells, rupture disc, inlet and outlet lines for gaseous reactant and/or products with suitable pressure regulators and by-passes for effecting gas flow through any desired path. The equipment is isolated, remotely controlled, and suitably shielded. Additionally, suitable temperature and pressure gauges, cold traps and analytical equipment such as infrared analyzer and vapor and liquid phase chromatographs are provided.

It is convenient to speak of the complex materials herein by using initials, and thus, perfluoroguanidine will be referred to as "PFG" and tris(difluoramino)fluoromethane often may be termed "TDF." Although both compounds are very energetic, there is a distinction in their chemical reactivities. "PFG" possesses a reactive carbon-nitrogen double bond which permits "PFG" to be a chemical intermediate. Reactions of the double bond with active hydrogen compounds, e.g. alcohols, amines, etc., leads to useful adducts from "PFG" but not from "TDF." For synthetic purposes, "PFG" (B.P. −2.3°±1° C.) is the preferred product from the fluorination of ammeline as opposed to "TDF" (B.P. +5.6°±1° C.) but the separation is relatively difficult. Clearly a procedure that provides a preponderance of "PFG" will yield a more valuable and more readily purified product for synthetic purposes.

The process of the invention is now more specifically illustrated by examples, including comparative results, showing the best mode presently contemplated of practicing the invention.

EXAMPLE 1

A 1500 ml. capacity stainless steel autoclave with inlet for mixed fluorine and nitrogen gases, and bleeding off more volatile by-products and fitted for agitation is charged with 1260 g. of inert perfluorinated cyclic ether, 90 g. of ammeline (technical grade), 45 g. of sodium fluoride and 24 g. of water. Agitation is commenced at 2000 r.p.m. and the reaction mixture is cooled to 10° C. Fluorine, diluted to about 90 percent concentration with nitrogen is passed through the reaction mixture at such a rate that in 102 minutes a total of 103.3 g. of fluorine has been added. The reaction mixture is filtered and a portion of the product separated by gas phase chromatography. The 21.3 g. of total product contains 34.7 percent by weight of perfluoroguanidine and 15.3 percent by weight of tris(difluoramino)fluoromethane.

EXAMPLES 2–4

A large series of runs in a 10 gal. (35–40 l.) reactor also shows the benefits derived from the process of the invention particularly by reference to three runs designated as Examples 2, 3 and 4 respectively, in which reaction conditions are sufficiently similar to be readily compared. Example 4 shows the process of the invention in which water is included and is compared to very similar Examples 2 and 3 from which water is excluded.

The reactor is fitted as described above and in each example is charged with 12 lbs. (5.5 kg.) of ammeline, 6 lbs. (2.7 kg.) of sodium fluoride and 100 lbs. (45 kg.) of perfluorinated cyclic ether. In Example 4 the charge further includes 2 lbs. (0.9 kg.) of water. In each example pressure is maintained at 30 pounds per square inch (2 atmospheres) above atmospheric pressure by the nitrogen used to dilute the fluorine while agitation at 950 r.p.m. is maintained for 180 minutes as a stream of 90 percent by volume of fluorine in nitrogen is introduced. There is a small variation in the actual rate of flow and in the temperatures. These variables and the yields of products are tabulated thus:

| Example | 2 | 3 | 4 |
|---|---|---|---|
| Water, kg | 0 | 0 | 0.9 |
| Temperature, ° C | −16 | −10 | −24 |
| Fluorine, kg | 5.45 | 5.73 | 5.89 |
| "PFG", kg | 0.286 | 0.281 | 0.56 |
| "TDF", kg | 0.294 | 0.344 | 0.186 |
| "PFG"+"TDF" | 0.580 | 0.625 | 0.746 |

Example 4, illustrating the process of the invention shows a significantly higher total yield of "PFG" and "TDF" combined not only on the weights of product but also based on the efficiency of use of fluorine. Even more significant is the fact that the yield of "PFG" is substantially doubled and that of "TDF" very nearly halved. These improvements represent changes in kind. Such changes in kind, differing among themselves in degree, are noted in other preparative examples employing the process of the invention.

EXAMPLE 5

In another example of the process in the 35–40 l. reactor used in Examples 2 to 4 inclusive, 18 lbs. (8.2 kg.) of ammeline, 2 lbs. (0.9 kg.) of sodium fluoride and 100 lbs. (45 kg.) of perfluorinated cyclic ether are charged together with 3.2 lbs. (1.5 kg.) of water, the reaction mixture is stirred at 950 r.p.m. at about −35° C. for 386 minutes as 14.5 lbs. (6.57 kg.) of fluorine is added diluted to 90 volume percent with nitrogen and maintaining 36 p.s.i. gauge pressure. The yield of "TDF" is approximately 0.136 kg. and of "PFG" it is approximately 1.08 kg.

It will be seen that although the total amount of ammeline is 50 percent higher than in Example 4 the total yield of "PFG" and "TDF" together, 1.216 kg., is greater than fifty percent higher than the total in Example 4, and the total consumption of fluorine is only slightly over 10 percent higher.

What is claimed is:

1. In a process for the direct fluorination of ammeline with elemental fluorine for the production of perfluoroguanidine, the improvement which comprises subjecting a reaction mixture comprising ammeline to the action of fluorine in the presence of water in amount of 0.1 to 10 times the weight of ammeline while agitating said reaction mixture at a temperature in the range of −40° to +35° C. and at pressure up to about 10 atmospheres.

2. A process according to claim 1 wherein an inert liquid fluorinated compound is used as a diluent and the weight of water is from 0.1 to 3 times the weight of ammeline.

3. A process according to claim 1 wherein sodium fluoride is included in the reaction mixture in amount of from about ten to about 100 percent of the weight of ammeline.

References Cited

UNITED STATES PATENTS 3,228,936    1/1966    Davis et al. _____ 260—564 X

OTHER REFERENCES

Emeleus et al.: Advances in Inorganic Chemistry, vol. 3, 1961, pp. 357–360.

CHARLES B. PARKER, *Primary Examiner.*

ROBERT V. HINES, *Assistant Examiner.*

U.S. Cl. X.R.

260—249.8, 583, 694